United States Patent
Hosoi

(10) Patent No.: US 7,082,288 B2
(45) Date of Patent: Jul. 25, 2006

(54) CELLULAR PHONE, AND DATA PROTECTION METHOD AND PROGRAM THEREOF

(75) Inventor: Toshikatsu Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 459 days.

(21) Appl. No.: 10/323,913

(22) Filed: Dec. 20, 2002

(65) Prior Publication Data

US 2003/0119545 A1 Jun. 26, 2003

(30) Foreign Application Priority Data

Dec. 21, 2001 (JP) ............................. 2001-388970

(51) Int. Cl.
*H04M 1/00* (2006.01)
(52) U.S. Cl. .................... 455/78; 455/573; 455/575.1; 455/82
(58) Field of Classification Search ............. 455/575.1, 455/550, 90.1, 410, 411, 572, 573, 574, 556.1, 455/557, 90.2, 90.3, 78, 79, 80, 81–83, 550.1, 455/575.4, 575.3; 345/169
See application file for complete search history.

(56) References Cited

U.S. PATENT DOCUMENTS

| | | | | |
|---|---|---|---|---|
| 4,972,503 | A | * | 11/1990 | Zurlinden ..................... 725/14 |
| 5,259,018 | A | * | 11/1993 | Grimmett et al. ............ 455/557 |
| 5,410,604 | A | * | 4/1995 | Saito et al. ................ 455/550.1 |
| 5,418,837 | A | * | 5/1995 | Johansson et al. ........... 455/558 |
| 5,687,216 | A | * | 11/1997 | Svensson .................. 455/412.2 |
| 5,839,058 | A | * | 11/1998 | Phillips et al. ............ 455/575.1 |
| 5,887,266 | A | * | 3/1999 | Heinonen et al. ............ 455/558 |
| 5,974,303 | A | * | 10/1999 | Krause .................... 455/575.1 |
| 6,314,307 | B1 | * | 11/2001 | Charron ...................... 455/573 |
| 6,356,741 | B1 | * | 3/2002 | Bilotti et al. ............... 455/90.1 |
| 6,445,932 | B1 | * | 9/2002 | Soini et al. .............. 455/556.1 |
| 6,463,293 | B1 | * | 10/2002 | Guyot et al. ................. 455/466 |
| 6,549,791 | B1 | * | 4/2003 | Jeon et al. ................... 455/572 |
| 6,611,693 | B1 | * | 8/2003 | Soini et al. .............. 455/566.1 |
| 6,684,082 | B1 | * | 1/2004 | McClure .................. 455/552.1 |
| 6,714,798 | B1 | * | 3/2004 | De Kermadec ............. 455/558 |
| 6,748,228 | B1 | * | 6/2004 | Izaki et al. ................. 455/462 |
| 2001/0007823 | A1 | * | 7/2001 | Lee ............................. 455/573 |
| 2001/0011032 | A1 | * | 8/2001 | Suzuki ........................ 455/574 |
| 2002/0010007 | A1 | * | 1/2002 | Goodings et al. ........... 455/566 |
| 2003/0003878 | A1 | * | 1/2003 | Bestle .......................... 455/90 |
| 2004/0018863 | A1 | * | 1/2004 | Engstrom et al. ........ 455/575.8 |
| 2004/0087353 | A1 | * | 5/2004 | Satoh et al. ............. 455/575.3 |
| 2005/0184961 | A1 | * | 8/2005 | Sugimoto ..................... 455/78 |

* cited by examiner

FOREIGN PATENT DOCUMENTS

JP 9-55781 A 2/1997

*Primary Examiner*—Lana Le
(74) *Attorney, Agent, or Firm*—Sughrue Mion, PLLC

(57) ABSTRACT

When a casing opening/closing detection circuit detects folding of a casing, a control circuit transmits an interruption signal to a CPU. Upon reception of the interruption signal, the CPU backs up data, which is to be protected and stored in a RAM, by transferring it to a FLASH ROM through a bus. In addition, when a battery residual amount detection circuit detects that a battery residual amount has dropped below a predetermined value because it was left unattended for a long time, the information of detection is similarly transmitted through an interruption signal to the CPU. By using the CPU for executing backing-up, and by using a battery falling-off prevention lock to impose physical restrictions in order to prevent falling-off of a battery during use of a cellular phone, data loss caused by unexpected occurrence such as battery falling-off can be dealt with.

4 Claims, 13 Drawing Sheets

CELLULAR PHONE, AND DATA PROTECTION METHOD AND PROGRAM THEREOF

BACKGROUND OF THE INVENTION

1. Field of the Invention

The present invention relates to a cellular phone, which has a casing to be opened/closed, and a battery to be removed.

2. Related Art of the Invention

A cellular phone is battery-driven electronic communication equipment, which incorporates a battery in a main body to supply operating power needed by an electronic circuit.

In a conventional cellular phone, it is one of indispensable necessities to store data regarding user's accounting information, failure history, call originating/incoming history including duration of call, parameters (base station information and the like) used for radio communications, and the like. Means for holding such information are classified into means for storage in volatile memories such as a dynamic random access memory (DRAM), and means for storage in nonvolatile memories such as a static random access memory (SRAM), an electrically erasable programmable read-only memory (EEPROM), a FLASH ROM, and a ferroelectric random access memory (FeRAM).

The DRAM that is a type of volatile memories is extremely inexpensive, and generally used as main memory means of electronic equipment such as a personal computer. However, since a capacitor inside the DRAM naturally discharges electricity to cause data loss when left unattended, the memory must be continuously refreshed at a given period. Accordingly, when the data are backed up by using the DRAM, a large electric capacity is necessary, and thus use of the DRAM is not suitable for the backup of the cellular phone, which has a limitation on a size of a battery.

Because of use of a flip-flop circuit for a memory element, in the case of the SRAM that is a type of nonvolatile memories, no memory refreshing needs to be carried out. Accordingly, while backup current is about 100 µA for the DRAM, only about 1 µA is enough for the SRAM, making a large electric capacity unnecessary. By using this feature of the SRAM, in a currently sold cellular phone, the SRAM is generally used as a backup memory in emergency in the form of being used in combination with a secondary battery. However, the SRAM has a limitation on a degree of integration because of its feature that the flip-flop circuit is used for the memory element. In addition, because of a higher price of the SRAM compared with the DRAM, a problem of product cost is inherent in the cellular phone.

The EEPROM is an electrically erasable programmable read-only memory. The EEPROM is similar to the SRAM in that data are not erased even if power is turned off, but more inexpensive than the SRAM. On the other hand, data erasure of the EEPROM has drawbacks: (1) voltage higher than 5 V is necessary, (2) a certain amount of bits must be rewritten even in the case of 1 bit rewriting, and (3) erasing/rewriting can be carried out only up to several hundred thousand to several million times. The FLASH ROM is an improvement on the drawbacks of the EEPROM. The FLASH ROM enables memory erasure to be carried out by block units. However, a limitation still remains on the number of erasing/rewriting times.

The FeRAM is a ferroelectric nonvolatile memory. The FeRAM has features: (1) a writing speed is faster compared with the FLASH ROM, and (2) a life is longer compared with the FLASH ROM. However, the FeRAM has a drawback that since data are destroyed when reading is carried out, writing must be carried out again after the reading. Thus far, various improvements have been made to solve this drawback.

By using the features of the above-described various memories, various backup methods have been presented.

A method is available, which protects stored data from being lost by using a nonvolatile memory to provide backing-up by a primary or secondary battery. As a past well-known example regarding a cellular phone for executing protection of such a type, Japanese Patent Application Laid-Open Hei 09 (1997)-055781 discloses a method of holding data by using charging voltage of a capacitor as a power source when a battery power failure occurs, and transferring a content of a buffer memory to an EEPROM by hardware.

In addition, a method that uses not an expensive SRAM but a FLASH ROM is also available. In Japanese Patent Application 2000-304283 that has already been filed, execution of writing in a FLASH ROM by detecting falling-off of a battery cover is described. This application will be disclosed shortly.

However, in the invention described in Japanese Patent Application Laid-Open Hei 09 (1997)-055781, a transfer circuit for the EEPROM must be added, and a large-capacity capacitor for writing a large amount of data must be provided. Thus, miniaturization of a cellular phone becomes difficult.

In addition, in a cellular phone, base station information between the phone and a base station, positional information, and information regarding call must be held at the cellular phone side. Further, by recent popularization of Internet, a browser (software for Internet access) and a mailer (software for electronic mail) have been loaded on the cellular phone. Further, by addition of a color display function or the like, a high-performance cellular phone that needs a large-capacity memory has become general, thereby creating a tendency to increase an amount of data to be backed up more and more. In the invention described in Japanese Patent Application Laid-Open Hei 09 (1997)055781, only data of several tens of bytes can be backed up. Consequently, it is difficult to back up data of kilo byte units or more, e.g., bookmarks of a telephone directory or a browser, and mail addresses. In addition, there is a problem of incapability of processing an expected increase of data to be protected.

With regard to the invention described in Japanese Patent Application Laid-Open 2000-304283, a product that has a battery and a battery cover integrated is now generally available, but the invention cannot be applied to this product.

SUMMARY OF THE INVENTION

A flip cellular phone having a casing to be folded according to the present invention includes a nonvolatile memory and control means for transferring data to be protected to the nonvolatile memory by folding the casing.

A flip cellular phone having a casing to be folded according to the present invention includes a nonvolatile memory circuit and a control circuit for transferring data to be protected to the nonvolatile memory circuit by folding the casing.

A data protection method in a flip cellular phone includes a step of transferring data to be protected to a nonvolatile memory by folding a casing of the cellular phone.

A program provides a function of transferring data to be protected to a nonvolatile memory by folding a casing to a cellular phone capable of folding the casing, and detecting the folding of the casing.

The flip cellular phone further includes means for detecting a change in a residual amount of a battery, wherein the control means transfers the data to be protected to the nonvolatile memory when a residual amount of the battery detected by the detection means drops below a predetermined amount.

The flip cellular phone further includes a detection circuit for detecting a change in a residual amount of a battery, wherein the control circuit transfers the data to be protected to the nonvolatile memory circuit when a residual amount of the battery detected by the detection circuit drops below a predetermined amount.

The data protection method further includes steps of monitoring a residual amount of a battery, and transferring the data to be protected to the nonvolatile memory when a residual amount of the battery becomes equal to/lower than a predetermined amount.

The program further provides a function of monitoring a residual amount of a battery, and transferring the data to be protected to the nonvolatile memory when a residual value of the battery becomes equal to/lower than a predetermined amount.

In the flip cellular phone, the control means checks presence of changes in a content of data stored in the nonvolatile memory and a content of data to be currently protected before the data to be protected are transferred to the nonvolatile memory, and transfers the data to be protected to the nonvolatile memory when a change of the data to be protected is determined.

In the flip cellular phone, the control circuit checks presence of changes in a content of data stored in the nonvolatile memory circuit and a content of data to be currently protected before the data to be protected are transferred to the nonvolatile memory circuit, and transfers the data to be protected to the nonvolatile memory circuit when a change of the data to be protected is determined.

In the data protection method,
steps of checking a difference from past data before the data to be protected are transferred to the nonvolatile memory, and
transferring the data to the nonvolatile memory only when a difference of data is determined.

In the program, a difference from past data is checked before the data to be protected are transferred to the nonvolatile memory, and the data are transferred to the nonvolatile memory only when a difference of data is determined.

A flip cellular phone having a casing to be folded includes a nonvolatile memory, detection means for detecting a residual amount of a battery, and control means for transferring data to be protected to the nonvolatile memory by folding the casing, wherein the control means checks presence of changes in a content of data stored in the nonvolatile memory and a content of data to be currently protected before the data to be protected are transferred to the nonvolatile memory when a residual amount of the battery detected by the detection means drops below a predetermined amount, and the control means transfers the data to be currently protected to the nonvolatile memory when a change of the data to be protected is determined.

A flip cellular phone having a casing to be folded includes a nonvolatile memory circuit, a detection circuit for detecting a residual amount of a battery, and a control circuit for transferring data to be protected to the nonvolatile memory circuit by folding the casing, wherein the control circuit checks presence of changes in a content of data stored in the nonvolatile memory circuit and a content of data to be currently protected before the data to be protected is transferred to the nonvolatile memory circuit when a residual amount of the battery detected by the detection circuit drops below a predetermined amount, and the control circuit transfers the data to be currently protected to the nonvolatile memory circuit when a change of the data to be protected is determined.

A data protection method in a flip cellular phone includes steps of detecting that a residual amount of a battery has become equal to/lower than a predetermined value, checking a difference between data to be currently protected and past data after the step of detecting, and transferring the data to be protected to a nonvolatile memory only when a difference of data is determined.

A program for transferring data to be protected to a nonvolatile memory by folding a casing provides functions of detecting that a residual amount of a battery has become equal to/lower than a predetermined amount, then checking a difference between data to be currently protected and past data, and transferring the data to be protected to the nonvolatile memory only when a difference of data is determined.

The flip cellular phone further includes a mechanism for imposing physical restrictions on the battery to be removed by opening the casing, and for releasing the physical restrictions of the battery by closing the casing.

The flip cellular phone further includes a CPU, a dynamic memory for storing information data to operate the CPU, a static memory having instruction codes to operate the CPU, control means for controlling reading and writing of data in the dynamic and static memories, a detection means for detecting a folded state of the casing, a storage holding memory capable of electrically rewriting a content of currently executed processing and of holding a stored content, and a battery for operating the units, wherein when the folded state is detected by the detection means, a content of the dynamic memory is written in the storage holding memory through the control means.

DETAILED DESCRIPTION OF THE PREFERRED EMBODIMENTS

Next, detailed description will be made of the preferred embodiments of the present invention with reference to the accompanying drawings.

Figure 1:
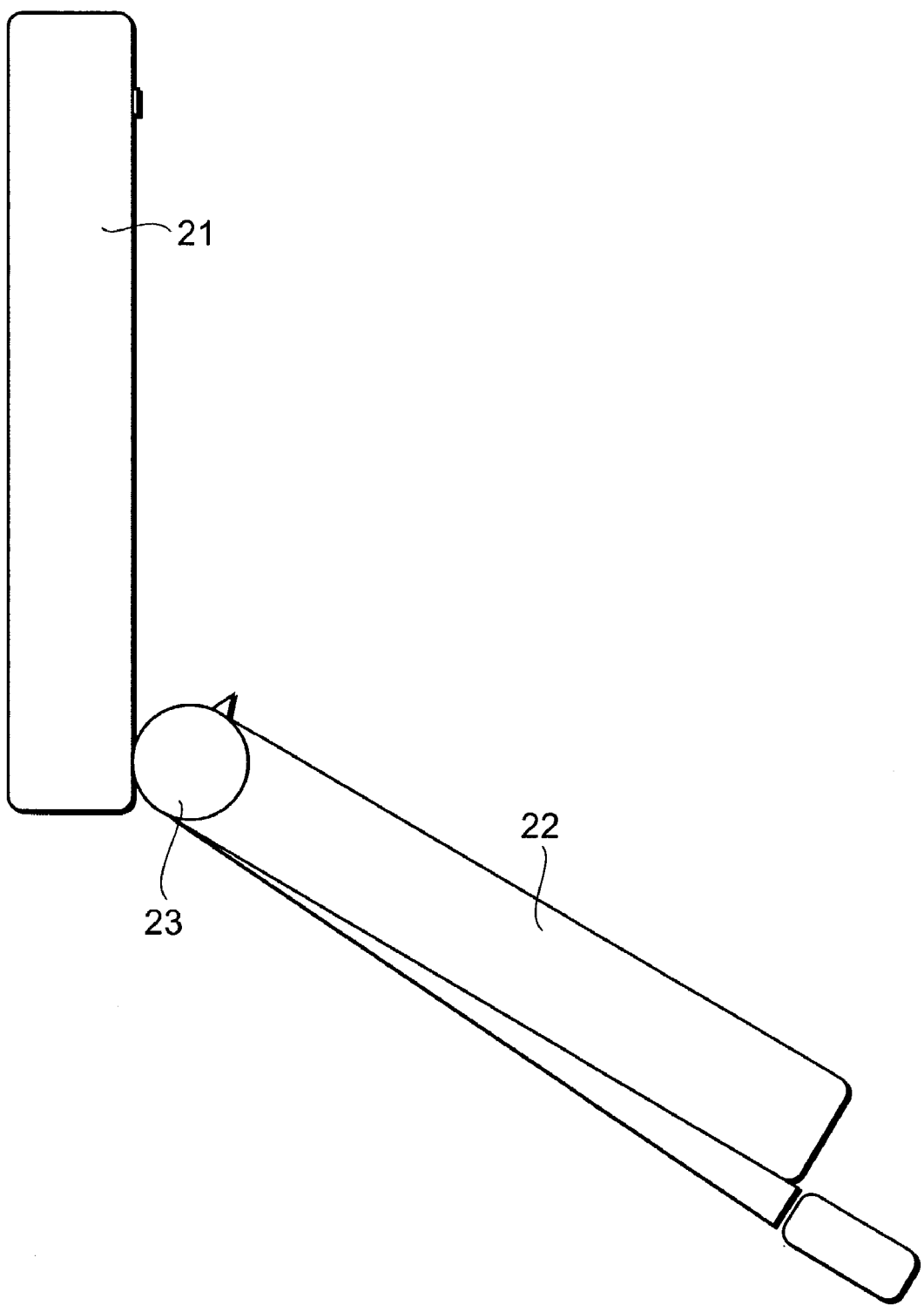
FIG. 1 is a side view of a cellular phone of a first embodiment of the present invention.

FIG. 1 is a side view showing a flip cellular phone in an opened state of its casing according to a first embodiment of the present invention. In FIG. 1, the flip cellular phone is composed of a first casing 21, into/out of which a battery 13 is inserted/pulled, and to which an operation panel or the like can be attached, a second casing 22, which can include an antenna unit, a radio transmitting/receiving circuit unit, a display 8, and the like, and a hinge unit 23 for interconnecting the first and second casings 21 and 22.

The hinge unit 23 is constituted by combining not-shown male and female hinges molded in the first and second casings 21 and 22. At the time of using the flip cellular phone, the first and second casings are rotated around the hinge unit to unfold the phone. In nonuse, the cellular phone is folded by rotating the casings around the hinge unit to improve housing capability. How the display 8, the battery 13 and the operation unit are arranged in the first and second casings 21 and 22 can be freely decided, and the antenna unit and the display 8 can be included in the first casing 21.

Figure 2:
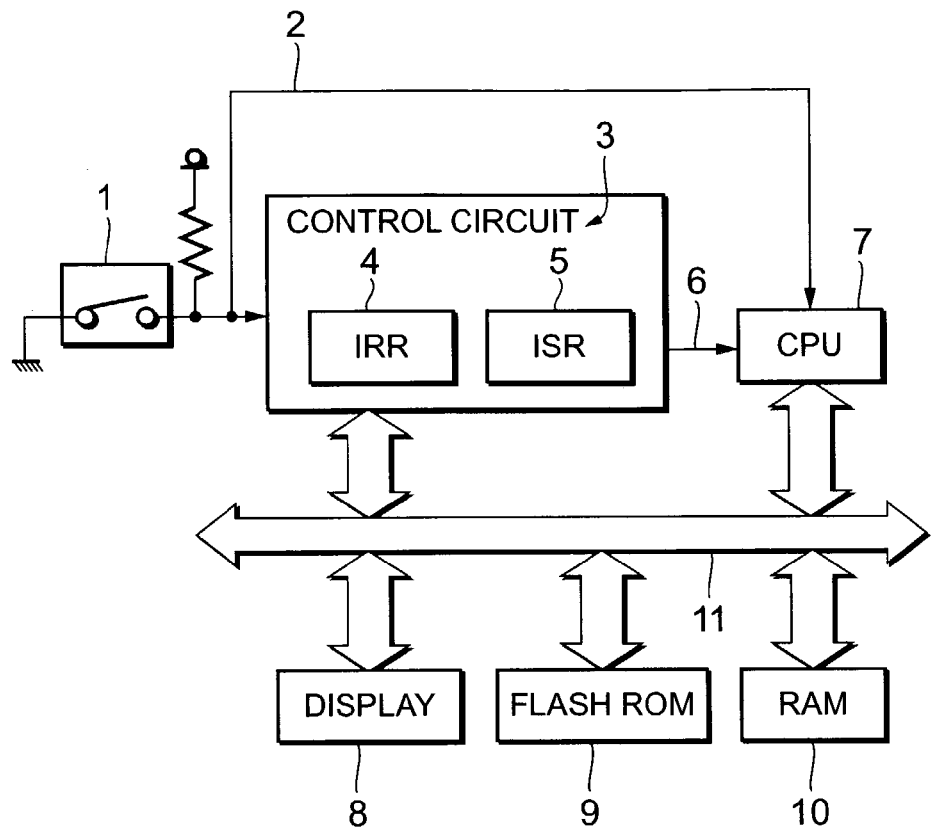
FIG. 2 is a block diagram showing an electric constitution of a cellular phone according to the first embodiment of the present invention.

FIG. 2 is a block diagram showing an electric constitution of the cellular phone according to the first embodiment of the present invention. The cellular phone of FIG. 2 is composed of a casing opening/closing detection circuit 1, a control circuit 3, a CPU 7, the display 8, a FLASH ROM 9 that is a type of nonvolatile memories, a RAM 10, a bus 11, and the battery 13 not-shown in FIG. 1 to supply operating power to each component. In the drawing, an antenna, a radio transmitting/receiving circuit, and a vibrator for taking a synchronous clock are omitted.

A casing opening/closing detection signal 2 outputted from the casing opening/closing detection circuit 1 is supplied as an input not only to the control circuit 3 but also to the CPU 7. The casing opening/closing detection signal 2 is used for monitoring a status of the casing opening/closing detection circuit 1. On the other hand, the control circuit 3 includes an interruption request register (IRR) 4 set in accordance with a change in a state of the casing opening/closing detection signal 2, and an interruption service register (ISR) 5 for indicating interruption processing, which is currently being processed or in wait for being processed, and the control circuit outputs a signal through an interruption signal line 6 to the CPU 7.

The IRR 4 is a register of 1 bit for holding an interruption request, and the number thereof equivalent to the number of interruption processing operations by hardware is necessary. On the other hand, the ISR 5 is a register for indicating processing highest in order of priority among currently requested interruption processing operations, or a register equivalent such as an arithmetic and logic circuit. For the ISR 5, a register or the like for indicating interruption processing of a highest order only needs to be provided. For example, if there are eight types of interruption processing from the outside, 8 bits are necessary for the IRR 4, while only 4 bits are necessary for the ISR 5. When a stage is reached to rewrite the ISR 5, the control circuit 3 outputs an interruption signal through the interruption signal line 6 to the CPU 7, and the CPU 7 suspends current processing to execute interruption processing and reads data from the ISR 5 through the bus. By reading the data from the ISR 5, the necessity for the CPU itself to determine which interruption request is highest in order can be eliminated, and a load reduction during programming can be expected.

Figure 3:
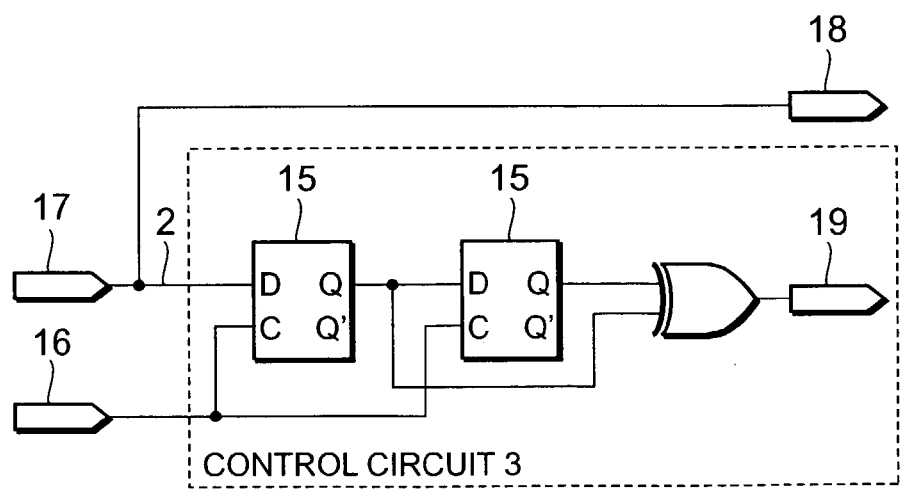
FIG. 3 is a circuit diagram of a circuit for generating a pulse to set an IRR when a casing opening/closing detection signal is changed.

FIG. 3 shows a basic concept of a pulse circuit for generating a pulse signal in accordance with a change of the casing opening/closing detection signal 2 outputted from the casing opening/closing detection circuit 1. This pulse circuit has a terminal 17 connected to the casing opening/closing detection circuit 1, and a terminal 16 connected to a crystal oscillator as input terminals from the outside. On the other hand, as output terminals, the pulse circuit has a terminal 18 connected to the CPU, and a terminal 19 connected to the IRR 4 corresponding to an interruption signal thereof. For the casing opening/closing detection circuit 1, two types of changes are conceivable, i.e., a change from an opened state to a closed state, and a change from a closed state to an opened state. In FIG. 3, the pulse circuit is designed to generate pulse signals in both of these two directions. In FIG. 2, this circuit is shown to be included in the control circuit 3. However, the pulse circuit may be positioned outside the control circuit 3. The control circuit 3 includes cascade-connected D flip-flop circuits (FF) 15, and an AND gate, to which outputs of the D flip-flop circuits 15 are entered. By these components, a pulse signal is generated in accordance with a change in the casing opening/closing detection signal 2. By this circuit, pulses are generated not only when the casing is changed from the opened state to the closed state but also when the casing is changed from the closed state to the opened state.

Figure 4:
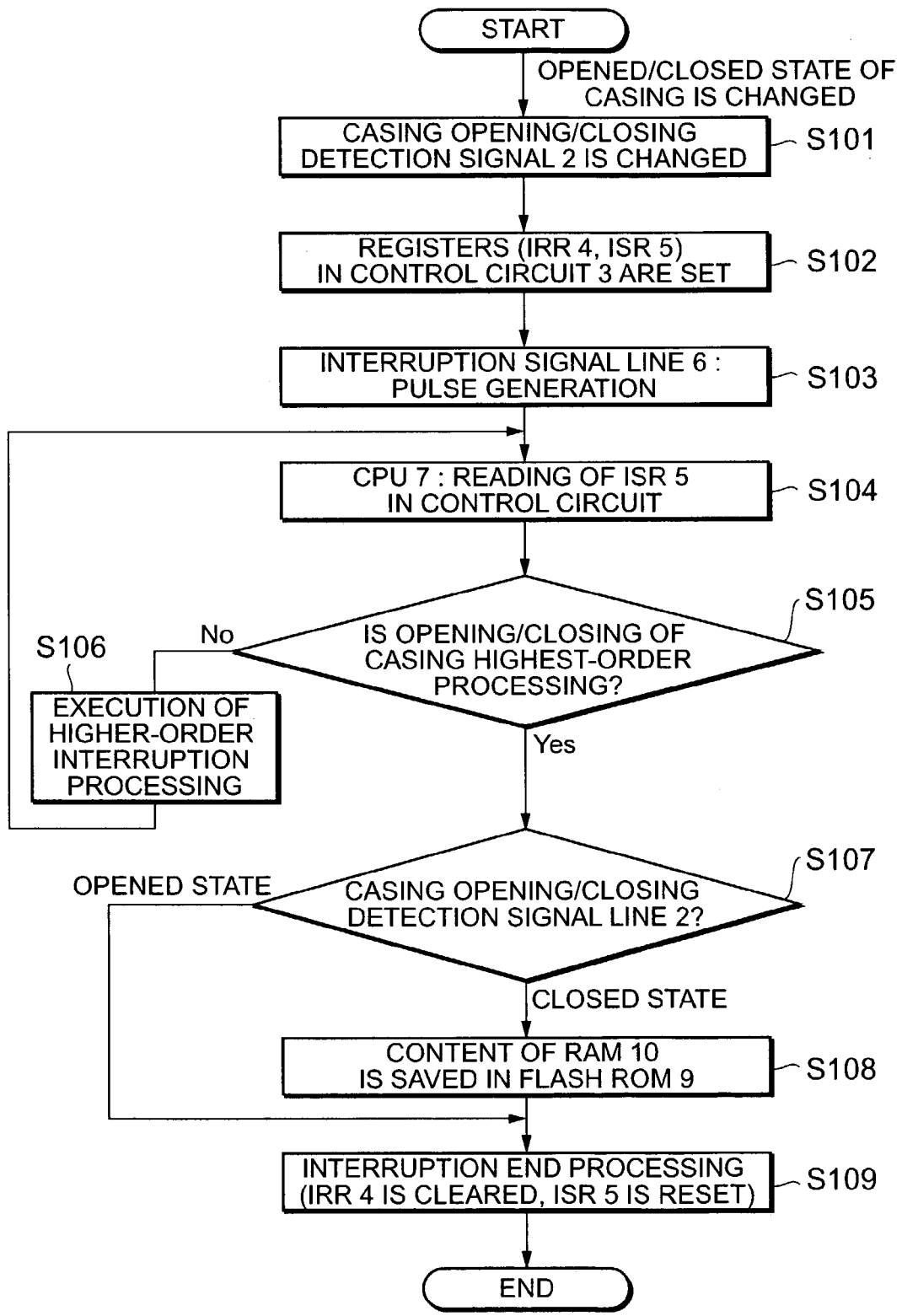
FIG. 4 is a flowchart showing a process when a casing is opened/closed in the flip cellular phone shown in FIG. 2.

FIG. 4 is a flowchart showing a process when the casing is opened/closed in the embodiment of the present invention shown in FIG. 2. Opening/closing of the casing causes a change in an output state of the casing opening/closing detection signal 2 from the casing opening/closing detection circuit 1 (S101). Following this change, by the pulse circuit of FIG. 3, a pulse of one clock width is generated in the control circuit 3. By this pulse, the IRR 4 in the control circuit 3 is set (S102), and determination is made as to whether this interruption request is higher or not in order of priority than a value currently set in the ISR 5. If the interruption processing by the opening/closing of the casing is higher in order of priority than the value recorded in the ISR 5, the value of the ISR 5 is rewritten. After the rewriting of the value of the ISR 5, an interruption request is made through the interruption signal line 6 to the CPU 7 (S103). If the interruption processing by the opening/closing of the casing is lower in order of priority than the value recorded in the ISR 5, the value of the ISR 5 is not rewritten, and processing that is being executed is continued. No interruption requests are made to the CPU 7 and, after the end of higher-order interruption processing, the process is started after the data of the ISR 5 is read by CPU 7. However, in FIG. 4, the operation of this case is not considered, and thus not shown.

Upon the entry of the interruption signal to the CPU 7 through the interruption signal line 6, the CPU 7 suspends currently executed processing in order to execute interruption processing. Then, the CPU 7 accesses the control circuit 3 to read the value of the ISR 5 (S104). If the value of the ISR 5 requires no backing-up, higher-order processing is executed (S106). If the value of the ISR 5 requires backing-up (S105), the CPU 7 checks the casing opening/closing detection signal 2. If the casing is in a closed state (S107), the CPU 7 executes an operation of writing data held in the RAM 10 in the FLASH ROM 9 (S108). The FLASH ROM 9 is a type of nonvolatile memories, and accordingly capable of holding data even without any power supplies. Therefore, information is protected. After the backing-up, when the IRR 4 is cleared, the control circuit 3 sets the ISR 5 again (S109). Subsequently, the CPU 7 checks a value of the ISR 5, verifies presence of higher-order interruption processing, and then resumes the processing before the interruption request is made.

The foregoing constitution/process enables backing-up to be started by closing the casing. In the flip cellular phone, an operation of closing the casing is normal processing, and no phenomena such as unstable supplying of power occur. Hence, a large amount of data can be stably backed up. Interruption processing operations of steps S102 to S106 in FIG. 4 are only examples. As interruption processing methods, other methods-than the foregoing, for example, a method of preparing an interruption signal from the IRR 4 to the CPU 7 for each interruption processing, and determining order of priority by the CPU 7, or the like may be used.

A method of executing the foregoing processing by software interruption without using any hardware interruption, a method of monitoring opening/closing of the casing by a program stored in the CPU at a given period without using any interruption, and the like can be cited as realizing means. For example, if the opening/closing of the casing can be verified based on a program, but no interruption signal lines are allocated for opening/closing detection of the casing, use of a program for detecting the opening/closing of the casing by using timer interruption at a given period may be conceivable.

Figure 5:
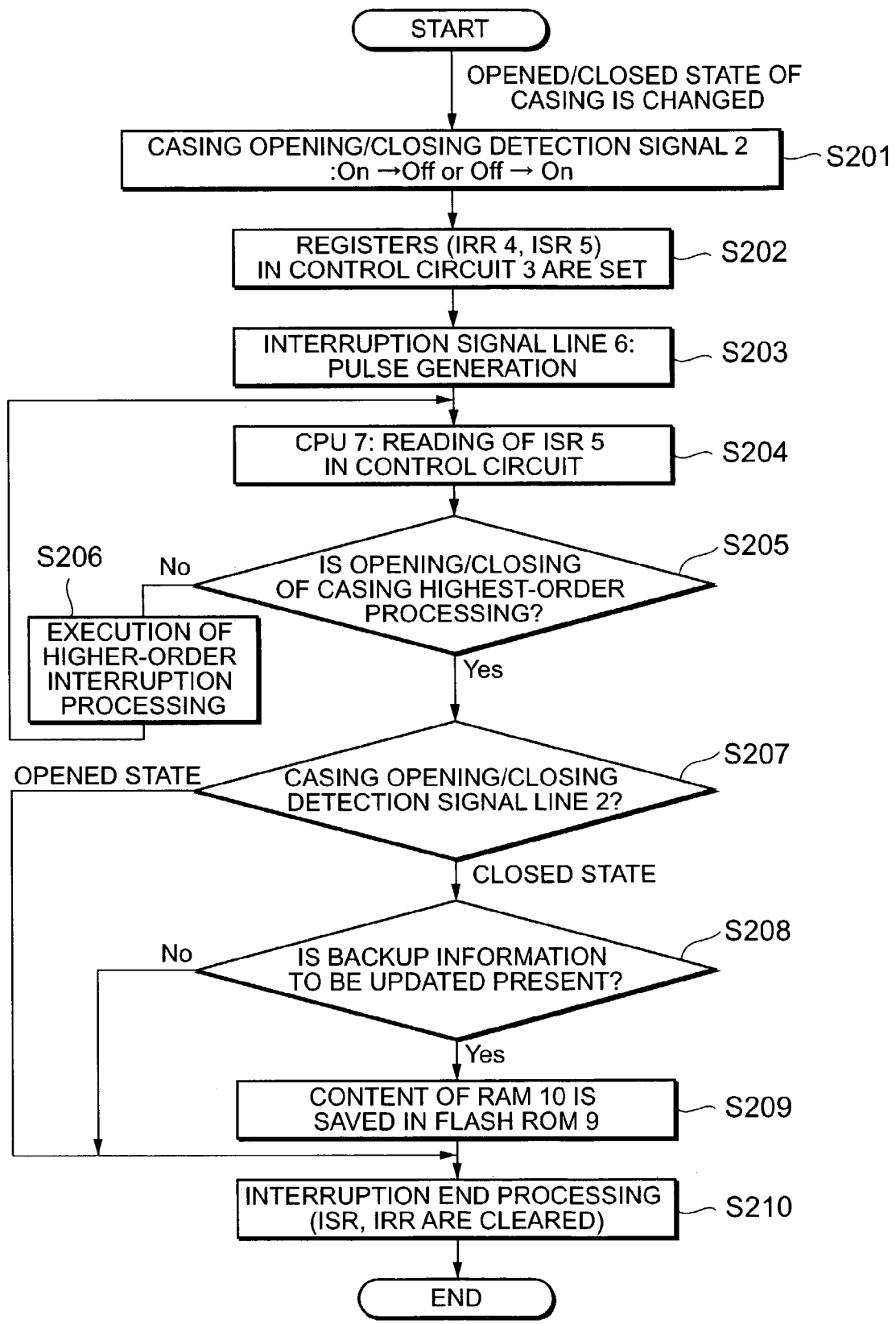
FIG. 5 is a process flowchart, in which a routine for determining a necessity of backing-up is added to the processing of FIG. 3.

FIG. 5 is a flowchart showing another process when the casing is opened/closed in the embodiment of the present invention shown in FIG. 2. In this flow, checking is made as to whether backup information has been updated or not during interruption processing (S208). If information to be updated is present, erasing/writing is executed (s209). If no information is present to be updated, erasing/writing processing itself of/in the FLASH ROM is not executed. The process is different from that shown in FIG. 4 in this point. Due to this difference, lives can be prolonged by reducing the number of erasing/rewriting times of the nonvolatile memories having lives, such as the EEPROM, the FLASH ROM, and the FeRAM.

For the method of checking the presence of information to be updated, a method of storing and managing such information in the RAM 10 by the CPU 7, or the like is available. According to the present invention, however, no particular limitations are placed in this regard. If checking processing of the information to be updated is carried out by a program, the hardware shown in FIG. 1 can be directly used. Further, depending on a processing constitution, processing can be changed for each data, for example only base station information is rewritten while user information of a mailer or a browser is not rewritten, or data are divided for each block, and only a block, in which data have been changed, can be backed up. In the described process, preferably, only a place, in which data have been changed, is erased/rewritten.

Figure 6:
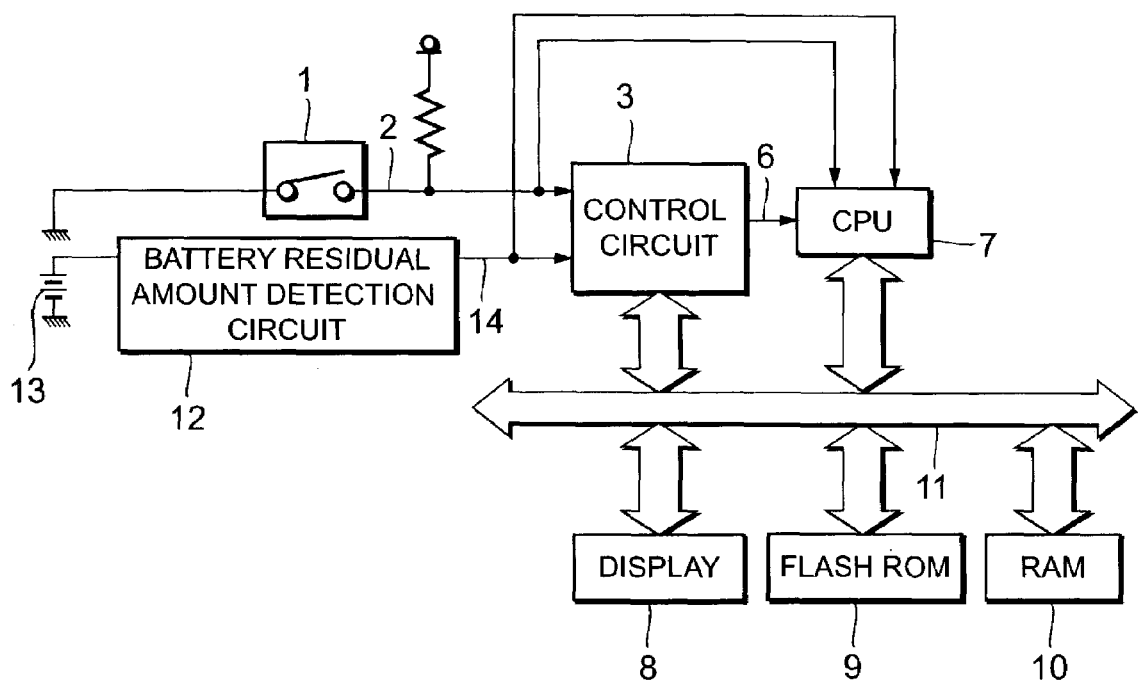
FIG. 6 is a block diagram showing an electric constitution according to a second embodiment of the present invention.

A situation that needs data backing-up occurs not only when the battery falls off, but also when a residual amount of the battery is reduced because of being left unattended or the like. FIG. 6 is a block diagram showing an electric constitution of a second embodiment, in which a mechanism of checking presence of a battery residual amount is added to the embodiment of FIG. 2. According to the present embodiment, in addition to the components of the block diagram of FIG. 1, a battery residual amount detection circuit 12 for detecting a residual amount of a battery 13, and a battery residual amount detection signal 14 for transmitting the detected residual amount of the battery to a control circuit 3 and to a CPU 7 are provided. In the control circuit 3, a pulse generation circuit shown in FIG. 7, and an IRR 4 set when a change in the battery residual amount is detected, are added. For a specific constitution of the battery residual amount detection circuit 12, no limitations are placed according to the present invention, but a method of checking voltage of the battery or the like may be generally used.

When the battery residual amount detection circuit 12 for detecting the residual amount of the battery 13 detects a change in the battery residual amount, which exceeds a specific threshold, the battery residual amount detection signal 14 is changed. When the battery residual amount detection signal 14 is changed, an interruption signal of one clock width is generated by the pulse generation circuit in the control circuit 3. By this interruption signal, a corresponding IRR 4 is set, and an ISR 5 is set as long as no data higher in order of priority are set. The interruption signal is transmitted through an interruption signal line 6 to the CPU 7.

Figure 7:
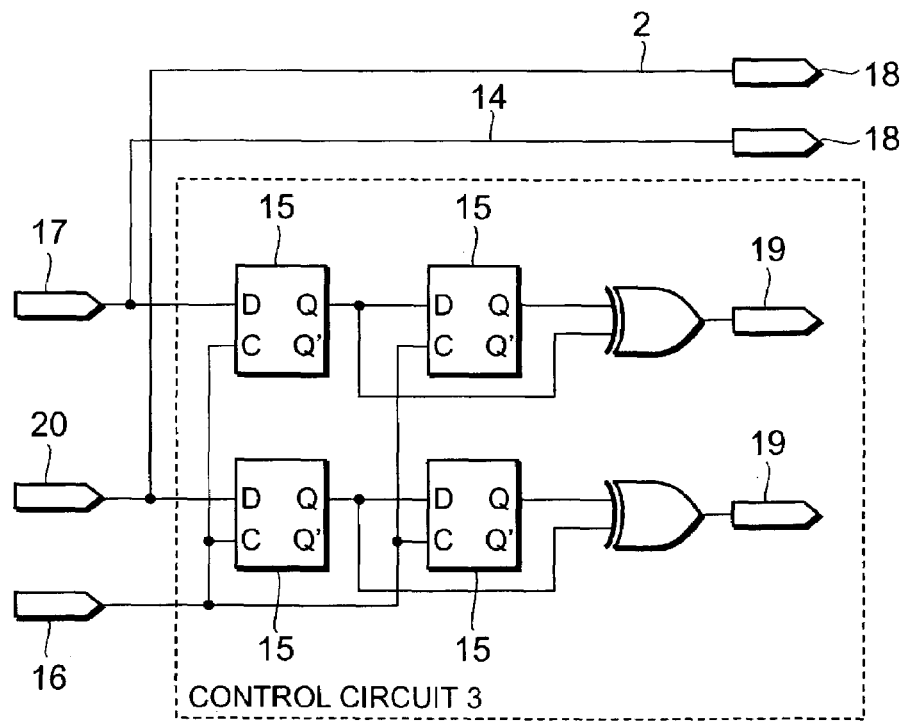
FIG. 7 is a circuit diagram of a circuit for generating a pulse according to the second embodiment.

FIG. 7 shows the pulse generation circuit when a battery residual amount detection mechanism is provided. A constitution is adopted, where in addition to the pulse generation circuit shown in FIG. 3, a pair of pulse generation circuits are further added, a circuit for recognizing casing opening/closing and a circuit for detecting a battery residual amount are prepared, and interruptions are separately generated therein. Accordingly, a terminal 20 from the battery residual amount detection circuit 12 is added as an input, and terminals to the IRR 4 and the CPU 7 are added one each as outputs.

Figure 8:
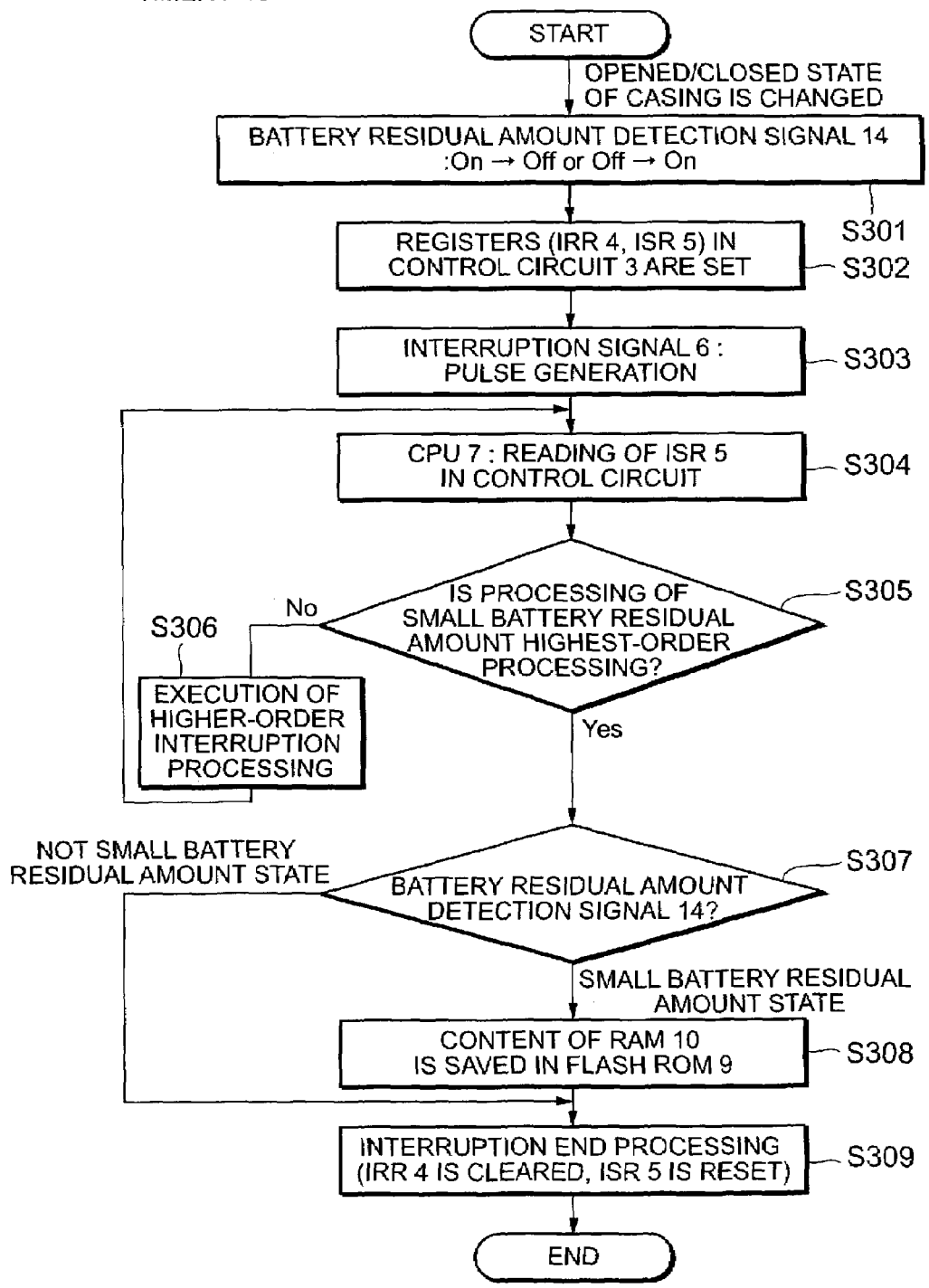
FIG. 8 is a flowchart showing a process when a residual amount of a battery changes according to the second embodiment.

FIG. 8 is a flowchart showing a process when a battery residual amount becomes small in the second embodiment shown in FIG. 6. When there is a change in a signal line indicating a battery residual amount (S301), the battery residual amount detection circuit 12 changes the battery residual amount detection signal 14 (S302) and, following this change, a pulse is generated in the control circuit. By this pulse, the IRR 4 is set, and the ISR 5 is properly rewritten if no higher-order interruption processing is present (S303). After the rewriting of the ISR 5, an interruption request is made through the interruption signal line 6 to the CPU 7. In response to the interruption request, the CPU 7 reads a value from the ISR 5 (S304). If the value of the ISR 5 corresponds to processing of a small battery residual amount (S305), the following processing at the time of the small battery residual amount is started.

If the value of the ISR 5 corresponds to the processing of the small battery residual amount (S305), the CPU 7 checks a state of the battery residual amount detection signal 14 outputted from the battery residual amount detection circuit 12 (S307). If a result of the checking shows that the battery residual amount is small, data in a DRAM 8 are baked up in a FLASH ROM 7 (S308). In this case, as in the case of the process when the casing is opened/closed shown in FIG. 5, if information has not been rewritten, by not executing backup processing, or by not executing backup processing for each data, prevention of deterioration of the FLASH ROM 7 can be actively pursued. Conversely, if the cellular phone is charged to be freed from the state of the small battery residual amount, by not executing unnecessary backup processing thereof, deterioration of the FLASH ROM is prevented (S307).

By adjusting a threshold for backing-up, backing-up can be carried out even in a stable state where power is supplied enough to execute backing-up.

Further, provision of backup means is inevitable for data protection, and, at the same time, a reduction of importance of backing-up by reducing necessity of performance of the backing-up itself is inevitable for the data protection.

Figure 9:
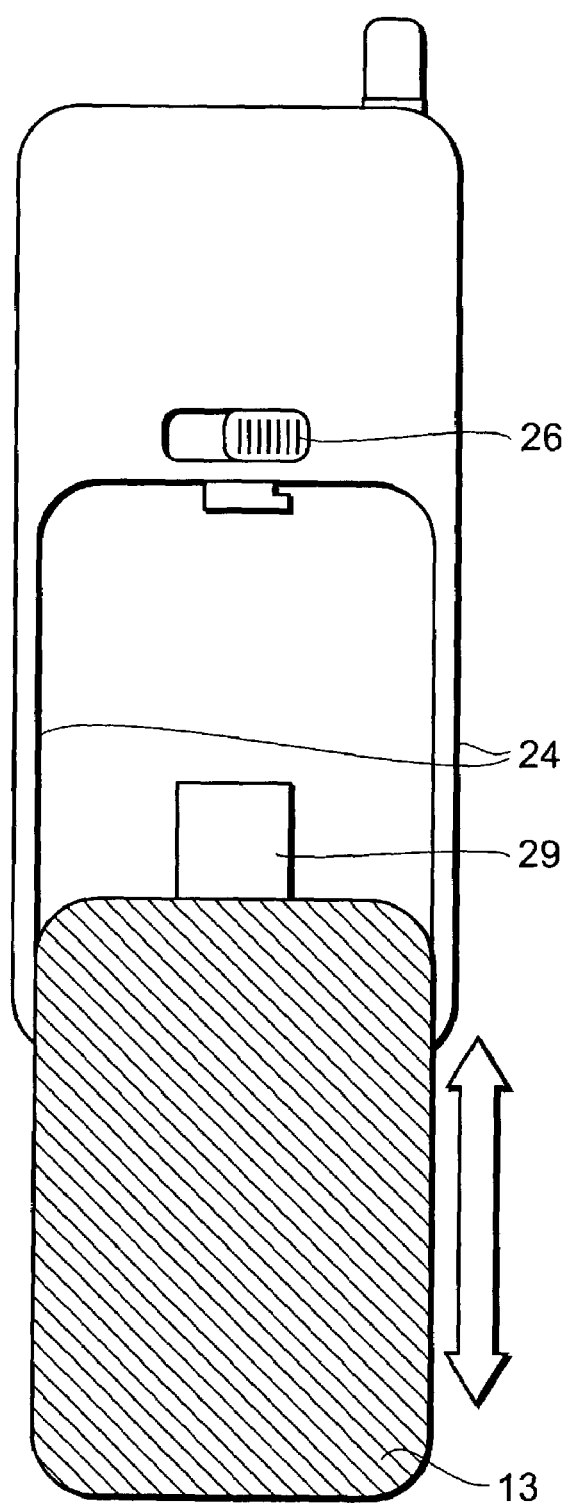
FIG. 9 is a plan view seen from a first casing side in a casing closed state of a flip cellular phone according to a third embodiment of the present invention.
Figure 10:
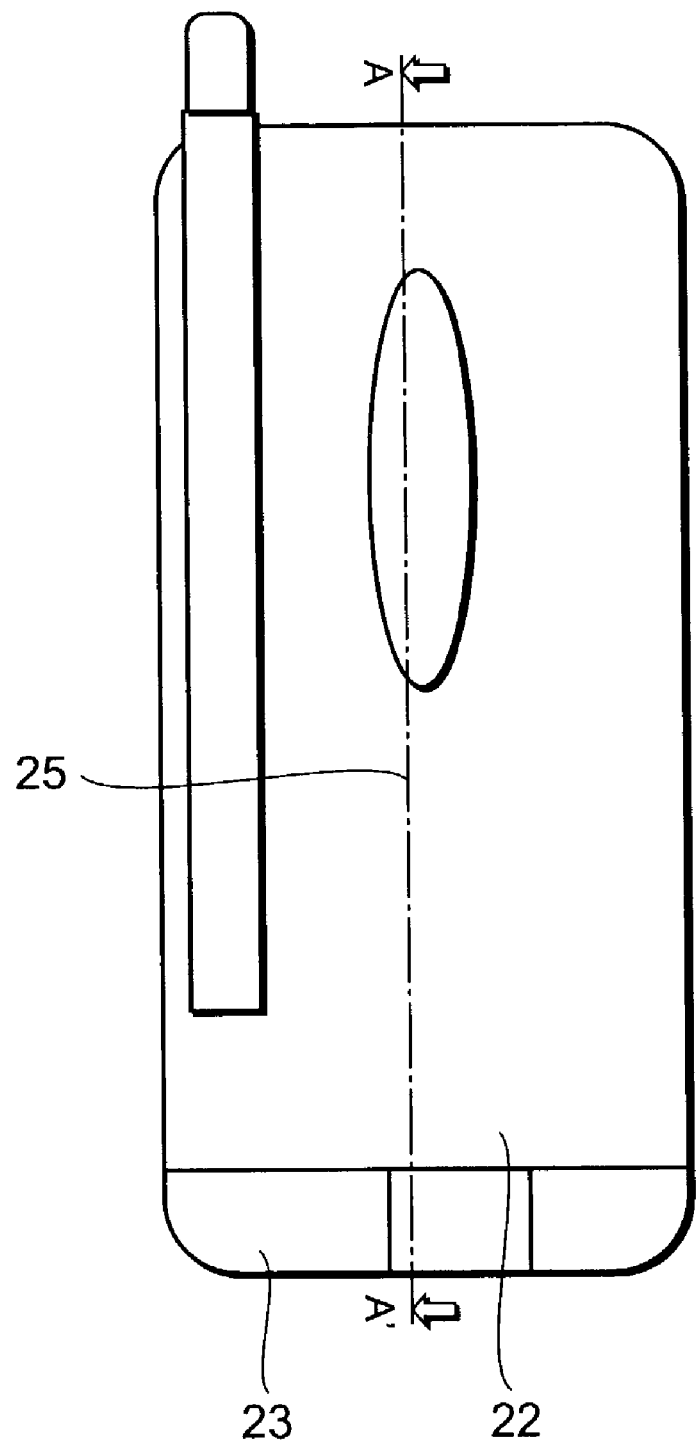
FIG. 10 is a plan view seen from a second casing side in a casing closed state of the flip cellular phone shown in FIG. 9.
Figure 11:
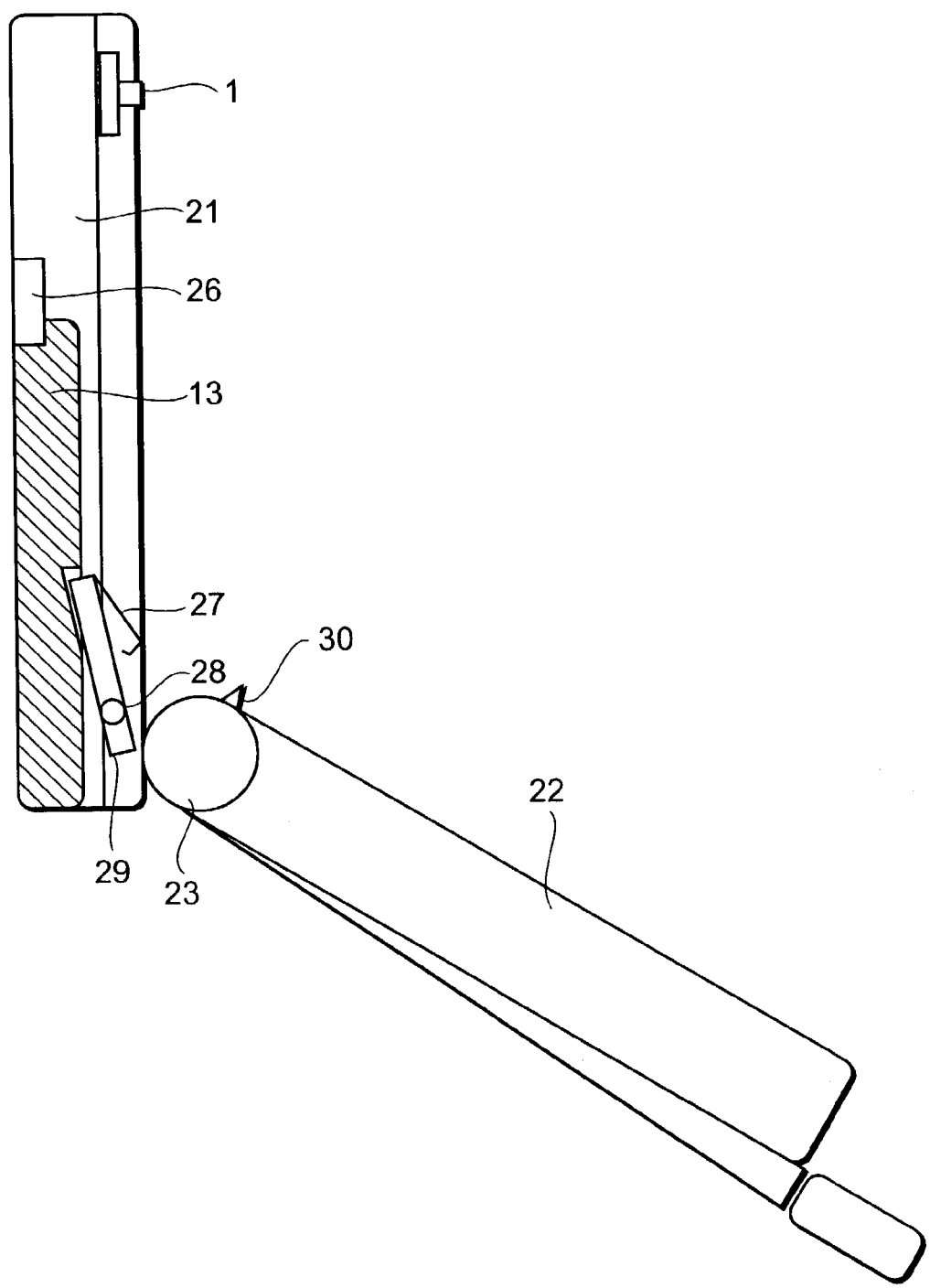
FIG. 11 is a sectional view taken along the line A–A' in a closed state of the flip cellular phone shown in FIG. 10.
Figure 12:
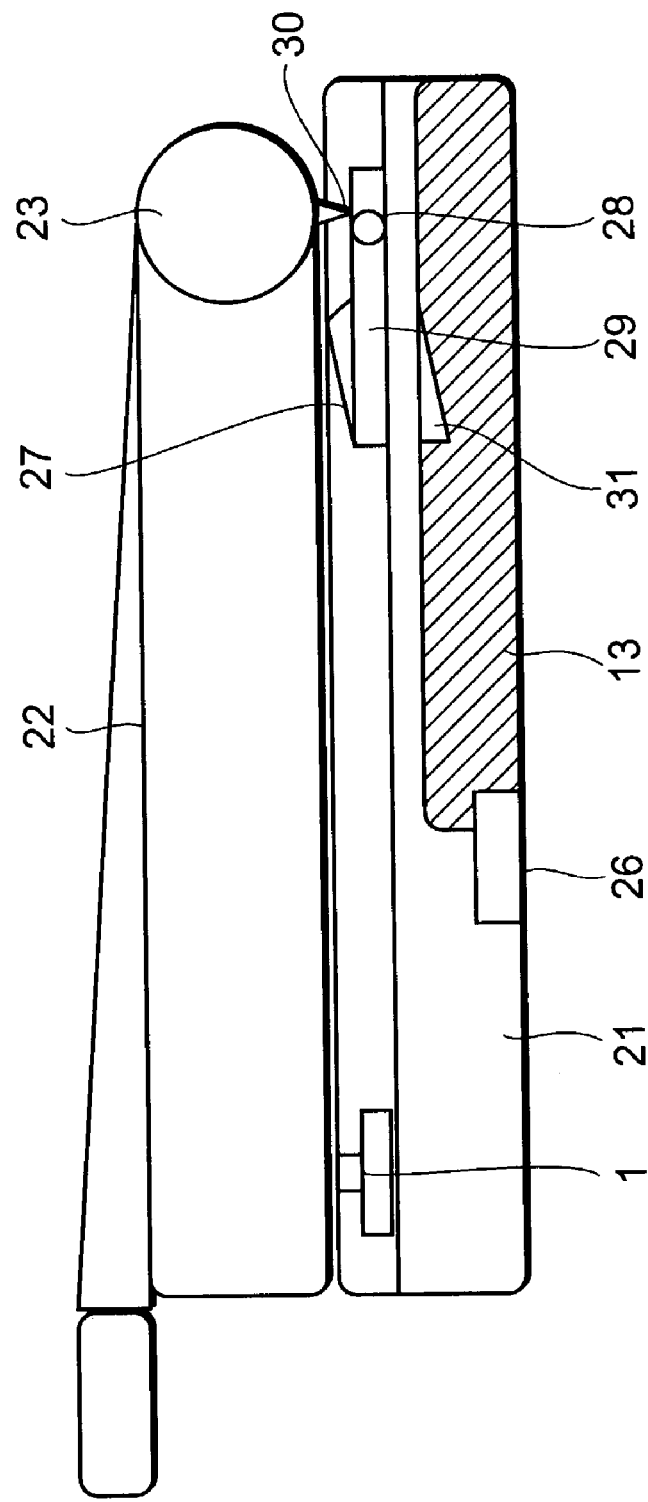
FIG. 12 is a sectional view taken along the line A–A' in an opened state of the flip cellular phone shown in FIG. 10.

FIGS. 9 and 10 show a cellular phone having a battery falling-off prevention mechanism according to a third embodiment of the present invention. FIG. 9 is a plan view seen from a first casing 21, and FIG. 10 a plan view seen from a second casing 22. FIGS. 11 and 12 are sectional views taken along the line A–A' in FIG. 10. FIG. 11 shows an opened state of a casing, and FIG. 12 a closed state of the casing.

Figure 13:
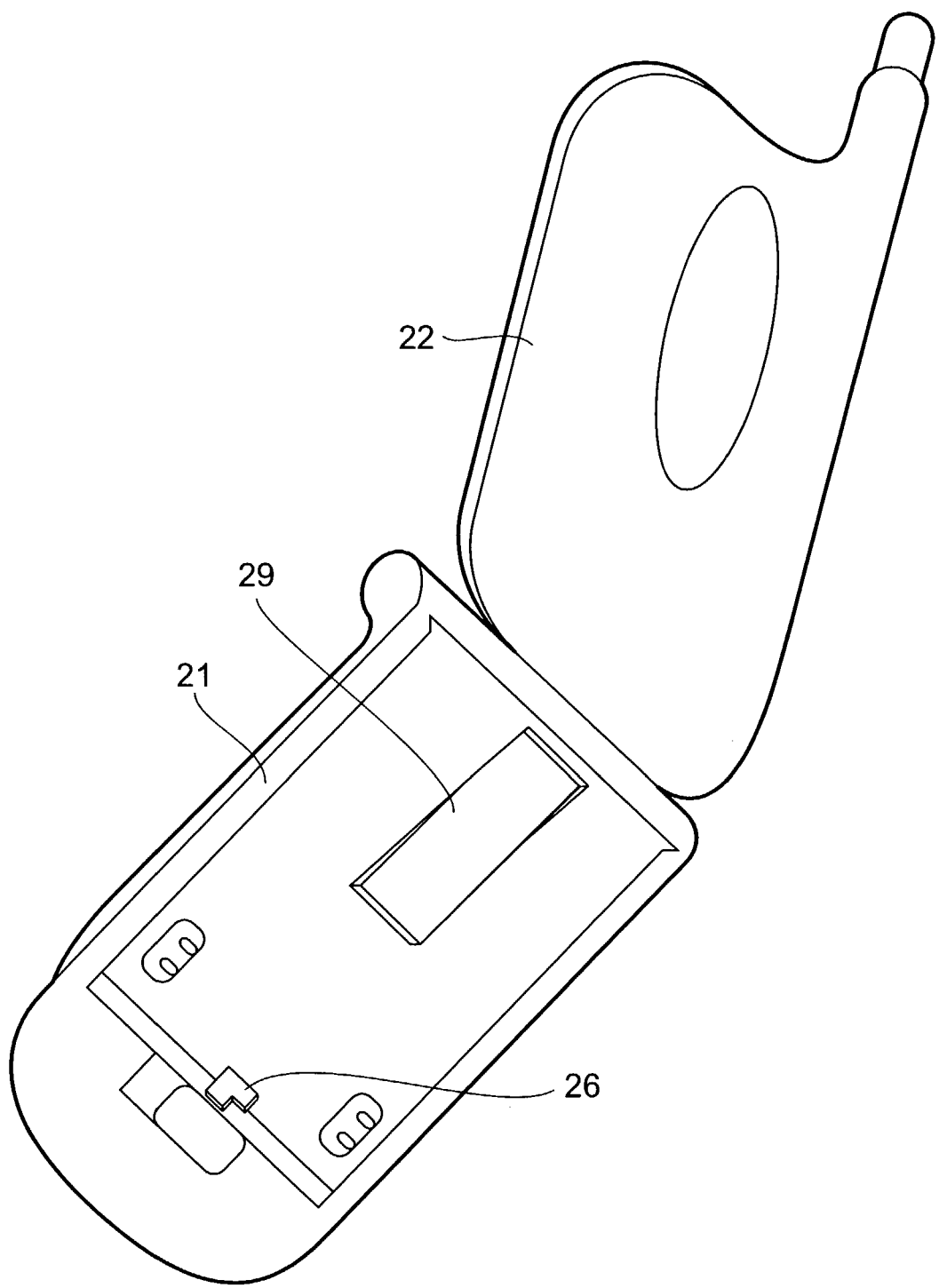
FIG. 13 is a perspective view of a backside of the cellular phone shown in FIG. 10.
Figure 14:
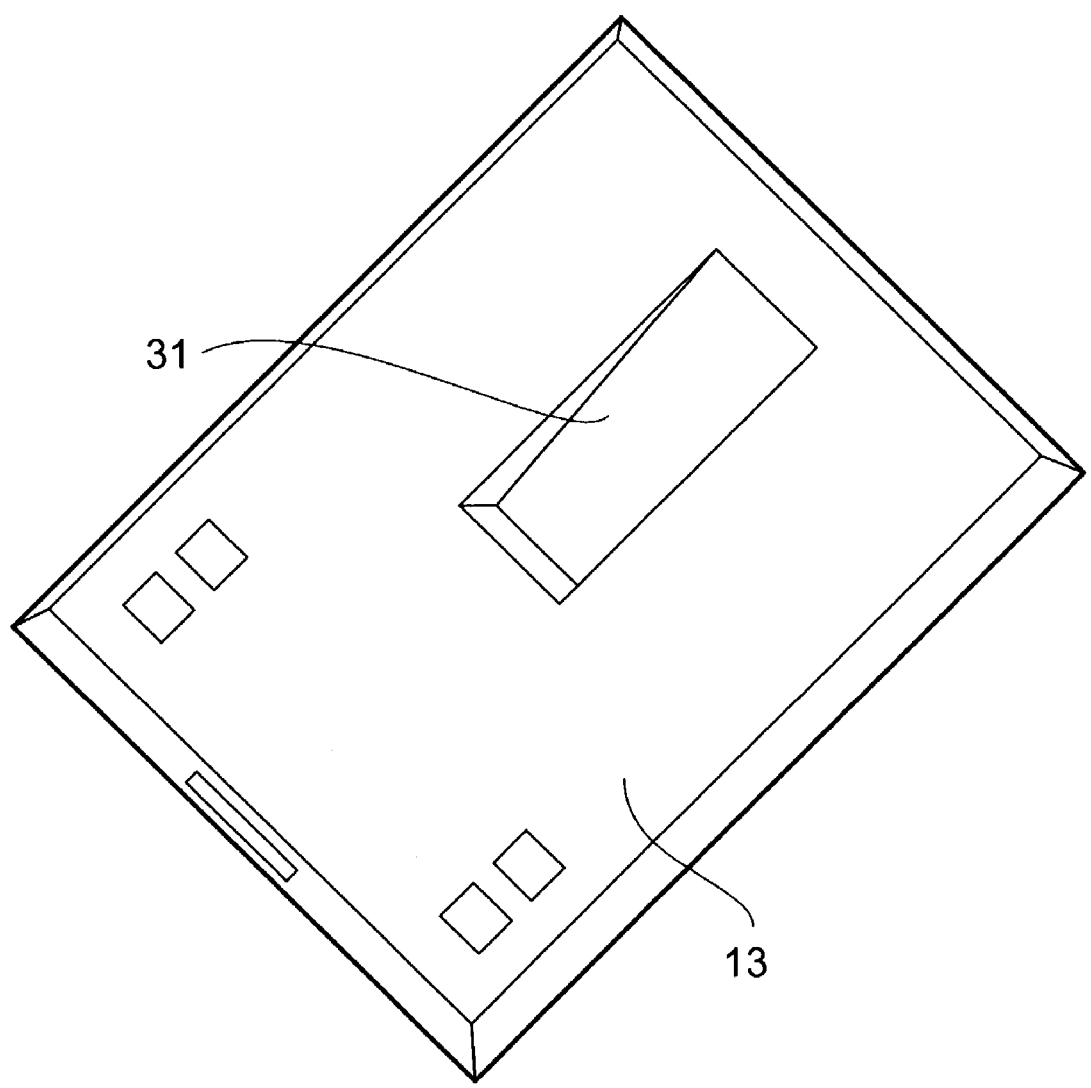
FIG. 14 is a perspective view of a battery for the cellular phone shown in FIG. 10.

The first casing 21 has a casing opening/closing detection circuit 1, a battery locking mechanism 26 for fixing a battery 13, a spring 27, a shaft 28, a lock 29, and a first casing side of a hinge unit 23. The battery locking mechanism 26 is a well-know component for preventing a battery from falling off when the battery is inserted/pulled out. The battery locking mechanism 26 is constituted of a part, to which an operator can apply a force, and a part for fixing the battery. The spring 27 shown in FIGS. 11 and 12 is fixed to the lock 29, which uses the shaft 28 as a fulcrum. The spring 27 has an effect of depressing the lock 29 by using the shaft 28 as a fulcrum if the lock 29 is not pressed by a projection 30 added to the hinge unit 23. FIG. 13 is a perspective view of the first casing 21 seen from a backside in a battery removed state. When the first casing 21 is seen from the backside, only the lock 29 can be seen. On the other hand, the second casing 22 includes a second casing side of the hinge unit 23, and the projection 30 is added to the hinge unit 23 of the second casing side. FIG. 14 is a perspective view of the battery seen from a surface to be brought into contact with the first casing 21 in the battery removed state. In the battery 13, a battery groove 31 is carved to lock the battery 13 at the time of opening the casing.

In the casing folded state of FIG. 12, the projection 30 of the hinge unit 23 depresses the lock 29 to prevent its falling into the battery groove 31. Accordingly, the lock 29 is released to enable the battery 13 to be removed. In the opened state of FIG. 11, the projection 30 of the hinge unit 23 is moved away from the lock 29, the lock 29 is set in the battery groove 31 by a reaction force of the spring 27, and battery falling-off is prevented by locking the battery itself.

According to the above-described structure, the battery is prevented from falling off in the opened state of the casing. On the other hand, since the battery 13 pushes the spring 27 in, a force greater than that of setting the battery 13 in the closed state is necessary. However, the battery 13 can be pushed in to be set without any difficulty.

Figure 15:
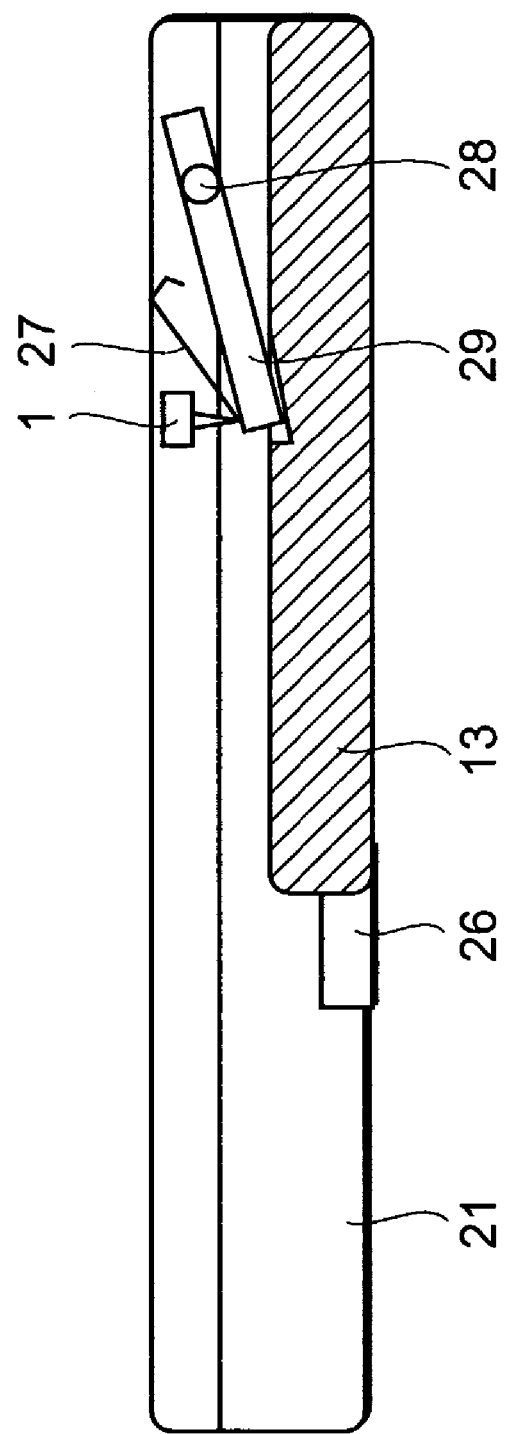
FIG. 15 is a sectional view showing another example of the third embodiment of the present invention.

The casing opening/closing detection circuit 1 is shown as a physical switch in FIGS. 11 and 12. However, a method of using a magnetic sensor or a read relay such as a hall element may be used. In FIGS. 11 and 12, the casing opening/closing detection circuit 1 is disposed on a contact surface between the first and second casings 21 and 22. However, the sensor can be positioned in any places as long as opening/closing of the casing can be detected. For example, FIG. 15 is a sectional view showing the first casing 21 of a system for detecting an opened/closed state of a casing opening/closing detection circuit 1 in accordance with movement of the lock 29. In the drawing, the movement of the lock 29 due to the spring 27 is observed by the casing opening/closing detection circuit 1. When the lock 29 binds the battery, a folded state of the casing is determined. When the lock 29 unbinds the battery, an opened state of the casing is determined.

In FIGS. 11 and 12, the fold opening/closing detection switch 1 is arranged at a tip of the casing. However, the casing opening/closing detection circuit 1 may be installed in the vicinity of the hinge unit 23 or in a place farthest from the hinge unit 23. Also, the casing opening/closing detection circuit 1 may be installed in the second casing side. Further, the spring 27 is shown to be a leaf spring in the drawing. However, other elastic bodies such as a coil spring can be used.

By combining the above-described inexpensive backup methods and the battery falling-off prevention mechanism with the first and second embodiments, it is possible to provide a cellular phone, which has an inexpensive memory backup mechanism and reduces occasions to execute backing-up necessary because of battery falling-off or the like caused by erroneous operations during call.

As apparent from the foregoing description, according to the cellular phone of the present invention, normal processing such as casing opening/closing is used as a trigger for executing backing-up, and determination is made as to necessity of backing-up in the nonvolatile memory such as a FLASH ROM. In this case, if backing-up is unnecessary, no erasing/rewriting is carried out, and backing-up is executed only when necessary. Thus, backing-up can be executed while preventing deterioration when the FLASH ROM or an EEPROM is used, and a great amount of data can be surely backed up.

Furthermore, ID information (telephone number or the like) of the current cellular phone is terminal intrinsic information, and the data must always be held. The FLASH ROM is prepared in the usual cellular phone for this purpose, and the information is stored-therein. Thus, by using the FLASH ROM or replacing it with a larger memory, costs can be reduced.

What is claimed is:

1. A flip cellular phone having a casing to be folded, comprising:

a battery;

first memory means for storing data;

nonvolatile memory means;

detection means for detecting a residual amount of the battery; and control means for transferring data to be protected that is stored in the first memory means to the nonvolatile memory means in response to folding of the casing, wherein the control means checks a difference between a content of data stored in the nonvolatile memory and a content of the data to be protected, and the control means transfers the data to be protected to the nonvolatile memory if the content of the data stored in the nonvolatile memory means is different from the content of the data to be protected and the residual amount of the battery detected by the detection means is equal to or lower than a predetermined amount.

2. A flip cellular phone having a casing to be folded, comprising:
   a battery;
   a first memory circuit that stores data;
   a nonvolatile memory circuit;
   a detection circuit that detects a residual value of the battery; and
   a control circuit that transfers data to be protected that is stored in the first memory to the nonvolatile memory circuit in response to folding of the casing, wherein the control circuit checks a difference between a content of data stored in the nonvolatile memory circuit and a content of the data to be protected, and the control circuit transfers the data to be protected to the nonvolatile memory circuit if the content of the data stored in the nonvolatile memory circuit is different from the content of the data to be protected and the residual amount of the battery detected by the detection circuit is equal to or lower than a predetermined amount.

3. A flip cellular phone having a casing to be folded, comprising:
   first memory means for storing data;
   nonvolatile memory means;
   control means that transfers data to be protected that is stored in the first memory means to the nonvolatile memory means in response to folding of the casing; and
   a mechanism for preventing a battery of the cellular phone from falling-off by imposing physical restrictions on the battery when the casing is opened, and for releasing the physical restrictions from the battery during the casing is closed.

4. A flip cellular phone having a casing to be folded, comprising:
   nonvolatile memory means;
   control means for transferring data to be protected to the nonvolatile memory by folding the casing;
   a CPU;
   a dynamic memory for storing information data to operate the CPU;
   a static memory having instruction codes to operate the CPU;
   control means for controlling reading and writing of data in the dynamic and static memories;
   detection means for detecting a folded state of the casing;
   a storage holding memory means capable of electrically rewriting a content of currently executed processing and holding a stored content; and
   a battery for operating the units,
   wherein when the folded state is detected by the detection means, the control means stores a content of the dynamic memory in the storage holding memory.

* * * * *